No. 611,148. Patented Sept. 20, 1898.
W. S. RAWSON.
APPARATUS FOR ELECTRICALLY COATING WIRE.
(Application filed Dec. 24, 1897.)
(No Model.) 2 Sheets—Sheet 1.
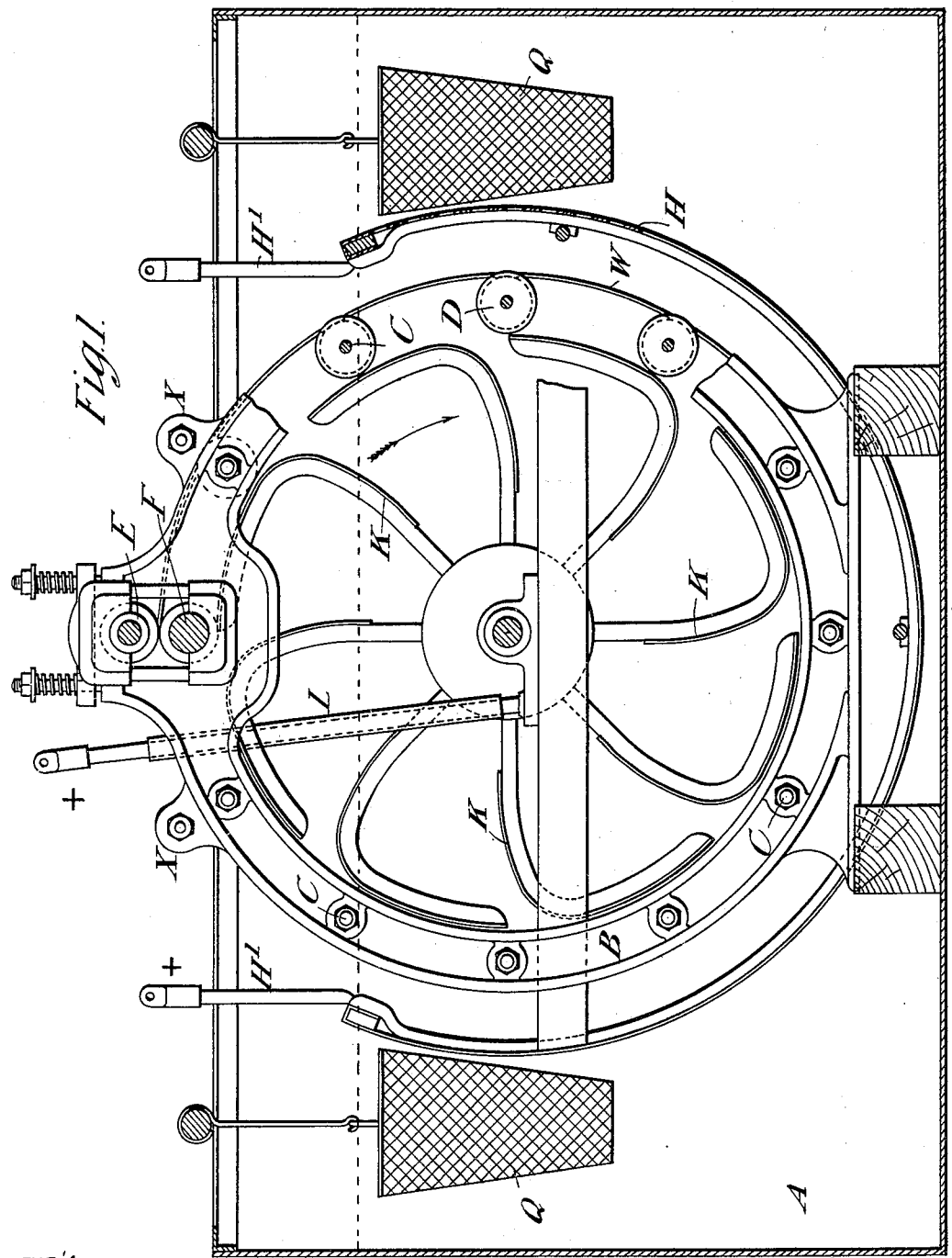
Witnesses.
Geo. N. Rea.
Robert Everett.
Inventor.
William S. Rawson.
By James L. Norris.
Atty.

No. 611,148. Patented Sept. 20, 1898.
W. S. RAWSON.
APPARATUS FOR ELECTRICALLY COATING WIRE.
(Application filed Dec. 24, 1897.)
(No Model.) 2 Sheets—Sheet 2.
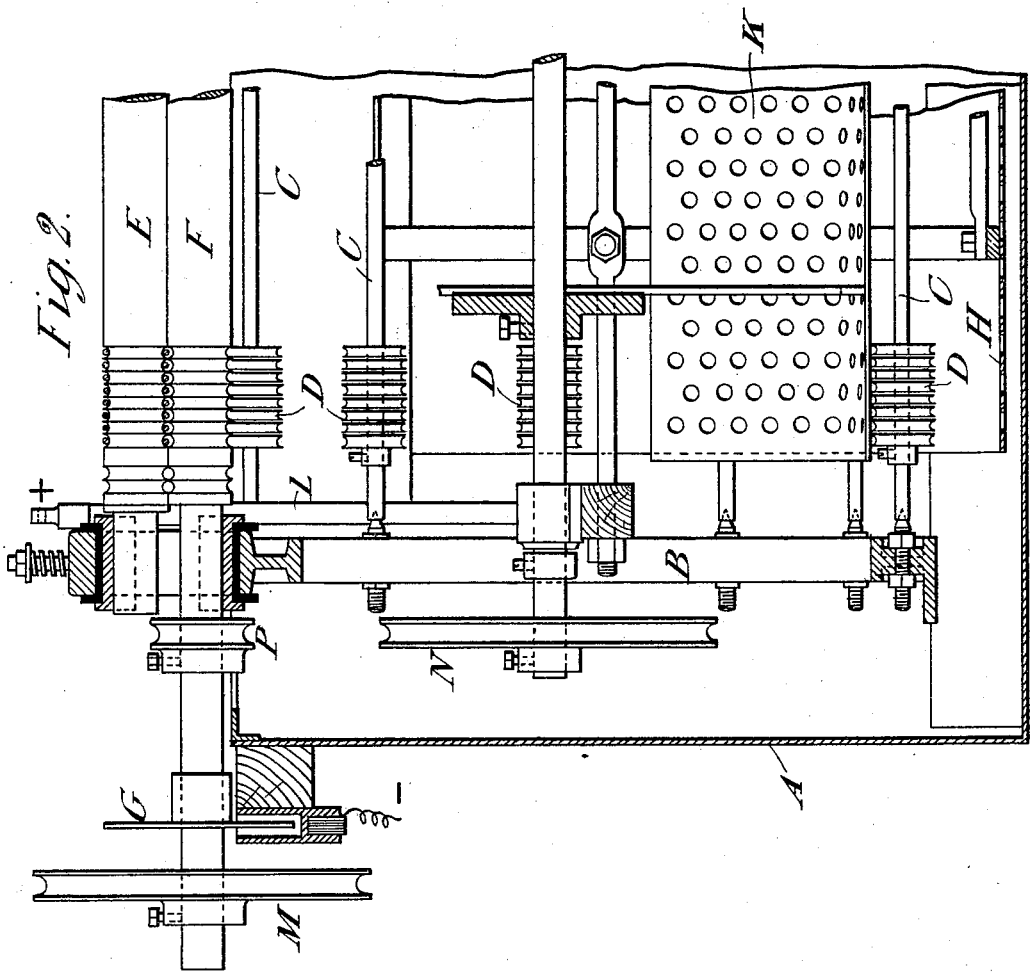
Witnesses,
Geo. W. Rea.
Robert Corcett.
Inventor.
William S. Rawson.
By James L. Norris
Att'y.

UNITED STATES PATENT OFFICE.

WILLIAM STEPNEY RAWSON, OF LONDON, ENGLAND.

APPARATUS FOR ELECTRICALLY COATING WIRE.

SPECIFICATION forming part of Letters Patent No. 611,148, dated September 20, 1898.

Application filed December 24, 1897. Serial No. 663,384. (No model.) Patented in England March 18, 1896, No. 6,069, and in France March 12, 1897, No. 264,927.

*To all whom it may concern:*

Be it known that I, WILLIAM STEPNEY RAWSON, a citizen of England, residing at No. 10 Walbrook, in the city of London, England, have invented certain new and useful Improvements in Apparatus for Electrically Coating Wire, (for which I have obtained patents in the following countries, viz: France, dated March 12, 1897, No. 264,927, and Great Britain, dated March 18, 1896, No. 6,069,) of which the following is a specification.

My invention relates to apparatus for electrically coating wire with metal in a continuous and rapid manner, which I shall describe, referring to the accompanying drawings.

Figure 1 is a transverse section, and Fig. 2 a part longitudinal section, of the apparatus.

In a tank A containing electrolyte liquid I fix on insulating-supports a pair of end frames B, having centers for a number of longitudinal spindles C, on each of which are mounted side by side a number of grooved pulleys D, made of non-conducting material, such as porcelain. In the upper parts of the frames B are formed insulated bearings for the journals of two grooved rollers, the upper one E having caoutchouc rings in its grooves and the lower one F having on its journal a metal disk G, revolving in a mercury-cup which is connected to the − terminal of a dynamo or other source of electricity. The rollers E and F are preferably geared together.

Outside the pulleys D is fixed a frame covered with perforated metal or network H, connected by rods H' to the + terminal of the source of electricity. In the space within the circle of pulleys D is concentrically mounted a wheel having a number of curved blades K, of perforated metal or network, and one or both of the bearings for the axle of this wheel is connected by a rod L, covered with insulating material, to the + terminal of the source of electricity. This wheel may be stationary, serving only as an anode; but I prefer to cause it to revolve in order to agitate the electrolyte liquid. The networks H and K are of such metal as is not attacked by the electrolyte at the + pole. For instance, when the electrolyte is a solution of zinc oxid in caustic alkali H and K may be of iron, the zinc deposited being supplied from fragments of zinc contained in pervious iron baskets Q, hung in the electrolyte outside of H, but not electrically connected with H. The continuous wire W is coiled in successive convolutions in the grooves of the roller F and of the pulleys D, being pressed into the grooves of F by the caoutchouc rings of the roller E and being thus put in electrical connection with the − terminal of the source of electricity constitutes a cathode on which is electrolytically deposited metal in solution in the electrolyte. The roller F being caused to revolve by a belt on a pulley M, driven by any convenient motor, and the central wheel, carrying the blades K, being preferably caused to revolve by a belt connecting a pulley N on its axle with a pulley P on the axle of F, the wire W is drawn many times, according to the number of its convolutions, through the electrolyte, which is kept in agitation by the blades K, and the wire issues from the last of the grooves of the roller F coated with the metal of the electrolyte.

Obviously metallic tape as well as wire may be coated as described.

Having thus described the nature of this invention and the best means I know of carrying the same into practical effect, I claim—

1. An apparatus for electrolytically coating wire, consisting of a tank for containing the electrolyte liquid, an upright insulated frame arranged to be partly immersed in said liquid, a plurality of pulleys circularly arranged on the insulated frame, an anode outside the circular pulleys, an anode located in the space within the circularly-arranged pulleys, and a cathode connection arranged to contact with the wire coiled about the pulleys, substantially as described.

2. An apparatus for electrolytically coating wire, consisting of a tank for containing the electrolyte liquid, an upright insulated frame arranged to be partly immersed in said liquid, a plurality of pulleys mounted in a circle on the insulated frame, an anode outside the circle of pulleys, a revolving anode in the space within the circle of pulleys, and a cathode connection arranged to contact with the wire coiled about the pulleys, substantially as described.

3. An apparatus for coating wire, consisting of a tank for containing the electrolyte liquid, a pair of rollers located above the tank and around which the wire to be coated is coiled in successive convolutions, a cathode connection for one of said rollers, an upright insulated frame arranged to be partly immersed in said liquid, a plurality of pulleys circularly arranged on the insulated frame and around which the wire to be coated is also coiled in successive convolutions, an anode outside the circularly-arranged pulleys, and an anode located in the space within the circularly-arranged pulleys, substantially as described.

In testimony whereof I have signed my name to this specification, in the presence of two subscribing witnesses, this 15th day of December, A. D. 1897.

WILLIAM STEPNEY RAWSON.

Witnesses:
JNO. P. M. MILLARD,
W. M. HARRIS.